(12) United States Patent
Takahashi

(10) Patent No.: US 7,279,648 B2
(45) Date of Patent: Oct. 9, 2007

(54) AUTOMOTIVE COMBINATION SWITCH

(75) Inventor: Atsuo Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/475,436

(22) Filed: Jun. 26, 2006

(65) Prior Publication Data

US 2007/0000761 A1 Jan. 4, 2007

(30) Foreign Application Priority Data

Jun. 30, 2005 (JP) .............................. 2005-192366

(51) Int. Cl.
 *H01H 9/00* (2006.01)
(52) U.S. Cl. ................. 200/61.54; 200/61.27
(58) Field of Classification Search ............ 200/61.54, 200/4, 332, 335, 61.27, 61.28, 61.29, 61.3, 200/61.31, 61.32, 61.33, 61.34, 61.35, 61.36, 200/61.37, 61.38
See application file for complete search history.

(56) References Cited

U.S. PATENT DOCUMENTS

| 5,936,215 | A | * | 8/1999 | Masuda et al. | ............ 200/61.3 |
| 6,222,142 | B1 | * | 4/2001 | Sano | ....................... 200/61.54 |
| 6,501,033 | B2 | * | 12/2002 | Pastwa et al. | ........... 200/61.27 |
| 6,872,897 | B2 | | 3/2005 | Otani et al. | |
| 6,956,177 | B2 | * | 10/2005 | Tanaka | ..................... 200/61.54 |

* cited by examiner

*Primary Examiner*—Elvin Enad
*Assistant Examiner*—Lheiren Mae A. Anglo
(74) *Attorney, Agent, or Firm*—Brinks Hofer Gilson & Lione

(57) ABSTRACT

An automotive combination switch includes a housing having an opening through which a steering shaft passes, and a stork switch having a switch box, that is inserted and mounted in the housing and a manipulating rod protruding from the switching box. Snaps protruding from the outsides of walls of the switching box are snap-fitted into locking holes formed on walls of the housing. A claw of each snap is in elastical contact with a periphery of each locking hole by providing an elastic plate in the housing, and elastically contacting the elastic plate to a front of the switch box in the inserting direction.

12 Claims, 3 Drawing Sheets

AUTOMOTIVE COMBINATION SWITCH

BACKGROUND

1. Field

An automotive combination switch having a housing including a stork switch, such as a headlight switch or a wiper switch, in which an automotive steering shaft passes through the housing is provided. In particular, the invention relates to a combination structure of the stork switch and the housing.

2. Related Art

In a conventional automotive combination switch, a housing having an opening through which a steering shaft passes is fixed to a stator of a car body, such as a column cover, a stork switch is provided to the left and right of the housing. Headlights, turn signals, or wipers are switched on/off by the stork switch. The housing, for example, is formed to have an inverted-U-shaped cross section consisting of a top plate and a pair of side walls and the opening is formed at the center of the top plate and a steering shaft passes through the opening. A switch box of the stork switch is inserted into the housing and fixed therein using a fixing means such as snap-fitting or threaded fastening (for example, JP-A-2003-132753 (3 and 4 pages, FIG. 1)). The switch box of the stork switch has a manipulating rod protruding from the switch box, and the above-mentioned several automotive parts are switched on/off by turning the manipulating rod in two directions.

In assembling the automotive combination switch, the stork switch is snap-fitted into the housing. This improves the assembling work efficiency and is increasingly improved as compared to the case of using screws to fix it. In the combined configuration of the stork switch by the snap-fitting, locking holes are generally formed on the walls of the housing and L-shaped snaps protrude from the outsides of the walls of the switch box corresponding to the housing's walls. When the switch box is inserted into the housing at a predetermined distance, the snap of the switch box is locked into the locking hole of the housing and a claw of the snap is locked, that is, snap-fitted to a periphery of the locking hole. Accordingly, the switch box is positioned in the housing and held in place.

The above-mentioned combined configuration that has a switch box of a stork switch and is snap-fitted into a housing is designed to lock the snap in the locking hole of the housing when the switch box is inserted into the housing at a predetermined distance. However, a clearance is required between the claw of the snap and the locking hole for smooth and inexpensive snap-fitting. In a case where a clearance is not defined between the claw of the snap and the locking hole involved, unless dimensional accuracy of each part is strictly maintained and the stork switch is carefully inserted into the housing, snap-fitting is difficult. As a result, the cost of the parts and the assembly greatly increases, thus resulting in an expensive combination switch. However, in the case of snap-fitting the stork switch in the housing in disregard of the rising cost, the stork switch still has a problem of rattling because the clearance between the claw of the snap and the locking hole causes it (switch box) to rattle after being combined in the housing.

SUMMARY

Considering the above problems, an automotive combination switch with a stork switch that is smoothly snap-fitted in a housing at low cost without rattling is provided.

An automotive combination switch includes: a housing having an opening through which a steering shaft passes and fixed to a stator of a car body; and a stork switch having a manipulating rod protruding from a switch box. Snaps protruding from the outsides of walls of the switch box are snap-fitted into locking holes formed on walls of the housing, respectively, by laterally inserting the switch box into the housing. Further, a claw of each snap is in elastically contact with a periphery of each locking hole by providing an elastic plate in the housing and elastically contacting the elastic plate to a front of the switch box in the inserting direction.

According to the automotive combination switch configured as described above, in an assembly process of the stork switch with the housing, when the switch box is inserted into the housing the front of the switch box comes in contact with the elastic plate, and the snap of the switch box is locked into the locking hole of the housing with the elastic plate pushed. In the stork switch snap-fitted in the housing, since the switch box is pushed by reacting force of the elastic plate in the opposite direction to the insertion, the claw of the snap is pushed against the periphery of the locking hole in the housing. Therefore, even though the combination switch is designed to have a required clearance between the claw of the snap and the locking hole to smoothly snap-fit the stork switch in the housing at a low cost, the stork switch does not rattle after mounted.

According to the configuration, the snaps are formed on the outsides of a pair of substantially parallel walls of the switch box in the inserting direction, and the locking holes are formed on a pair of substantially parallel walls of the housing. Therefore, the switch box is smoothly inserted into the housing without interference by the insides of the walls of the housing and held in place.

Further, according to the configuration, a recess is formed at the front of the switch box in the inserting direction, and the elastic plate of the housing is stuck into the recess. Accordingly, space factors are not affected by the elastic plate provided in the housing.

DESCRIPTION OF THE PREFERRED EMBODIMENT

Figure 1:
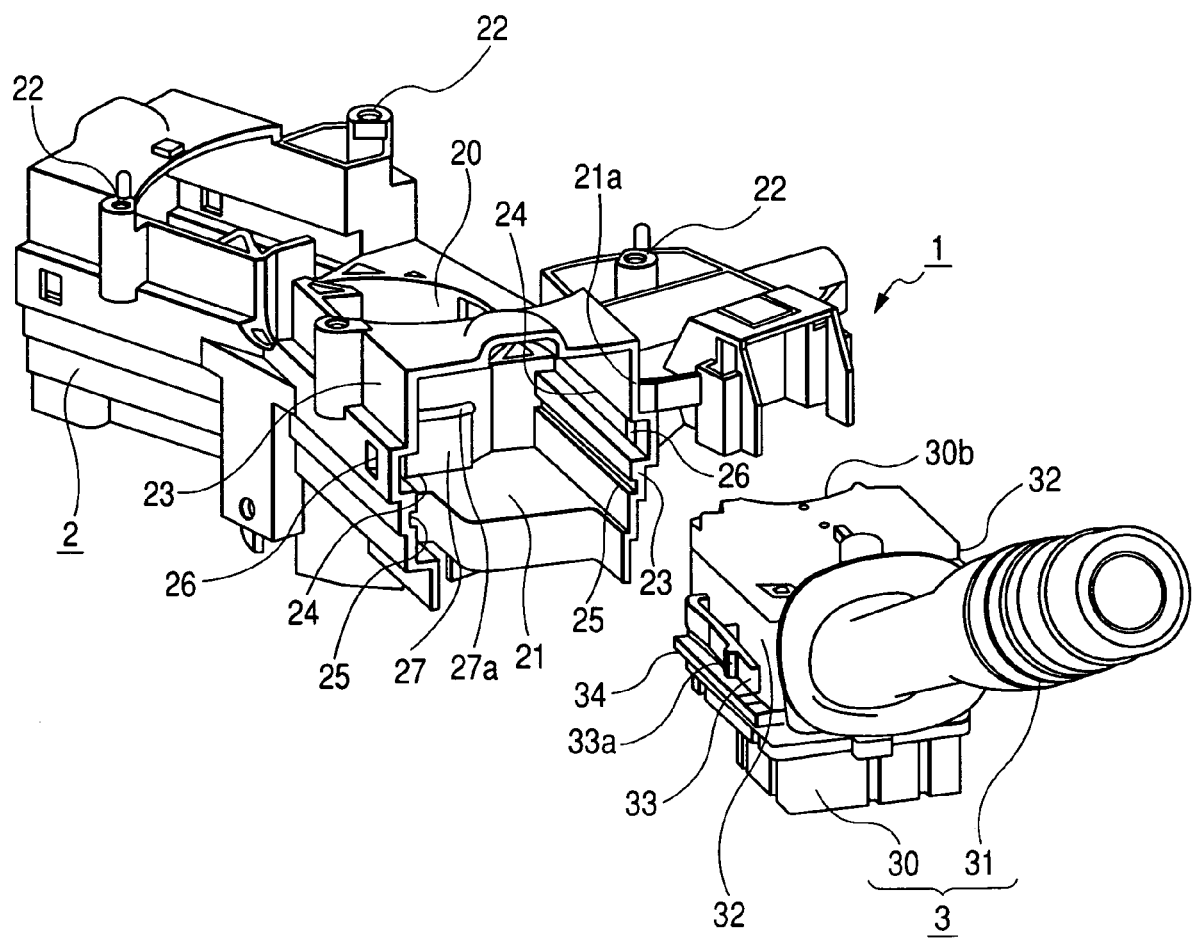
FIG. 1 is an exploded perspective view showing an embodiment of an automotive combination switch.

A preferred embodiment will now be described with reference to the accompanying drawings. FIG. 1 is an exploded perspective view of an embodiment of an automotive combination switch, FIG. 2 is a plan view illustrating configuration of a stork switch mounted in an automotive combination switch, and FIG. 3 is an assembly process chart of a stork switch being in elastically contact with an elastic plate in a housing.

Figure 2:
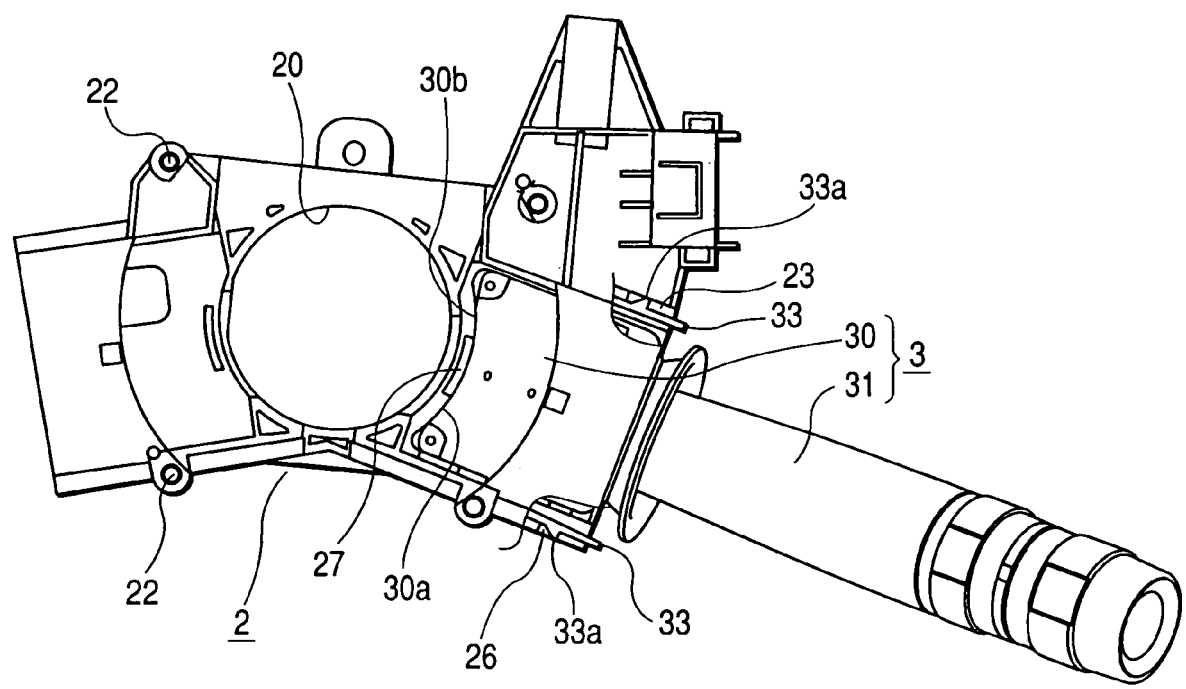
FIG. 2 is a plan view illustrating configuration of a stork switch mounted in the automotive combination switch.

As shown in FIGS. 1 and 2, an automotive combination switch 1 is provided with stork switches 3 (only one stork switch is shown) on the left and right sides of a housing 2. Automotive parts such as headlights, turn signals, or wipers are switched on/off by each of the stork switches. The stork switches 3 have the same configuration as each other, thus only one of them will be described hereinafter.

A circular opening 20 through which a steering shaft (not shown) passes is formed at the center of the housing 2, and a receiving portion 21 connected with a substantially rectangular mouth 21a is formed on the left and right sides of the housing 2. Several threaded holes 22 are formed at the bottom of the housing 2 to fix it to a stator (not shown) such as a column cover using screws. The stork switch 3 consists of a switch box 30 including a switch element and the like therein, and a manipulating rod 31 connected to and protruding from the switch box 30. The switch box 30 is inserted into a receiving portion 21 and snap-fitted in the housing 2. The automotive parts are switched on/off by turning the manipulating rod 31 in two directions.

When the stork switch 3 is combined with the housing 2 in an assembly process of the automotive combination switch 1, the switch box 30 is laterally inserted into the receiving portion 21 and snap-fitted in the housing 2. The combined configuration of the stork switch 3 will be described in detail below. A wide guide groove 24 and a narrow guide groove 25, which extend in the inserting direction of the switch box 30, are formed on a pair of substantially parallel walls 23 defining the receiving portion 21 of the housing 2, and a locking hole 26 is formed at a predetermined position in the wide guide groove 24. The elastic plate 27 is positioned at and protrudes from the rear center of the receiving portion 21, and its pushing-end 27a faces a center of the mouth 21a. That is, a position and height of the elastic plate 27 are determined such that a centerline L (see FIG. 3A) of the switch box 30 extends close to the pushing-end 27a of the elastic plate 27 in the inserting direction. As shown in FIG. 2, a profile of the elastic plate 27 in plan view is a curve taking the shape of the opening 20. In the stork switch 3, L-shaped snaps 33 and guiding protrusions 34 extending in the inserting direction are formed on the outsides of a pair of walls 32 of the switch box 30, which correspond to the insides of the walls 23 of the receiving portion 21. Each of the snaps 33 has a claw 33a snap-fitted in the locking hole 26. The snap 33 is wide so as to slide along the wide guide groove 24 and the guiding protrusion 34 is narrow so as to slide along the narrow guide groove 25. Further, as shown in FIG. 2, since a front 30a of the switch box 30 in the inserting direction is curved and takes the shape of the opening 20, a slight recess 30b is formed at the front 30a. When the stork switch 3 is combined with the housing 2, the elastic plate 27 is stuck into the recess 30b and in elastically contact with the front 30a.

Figure 3A:
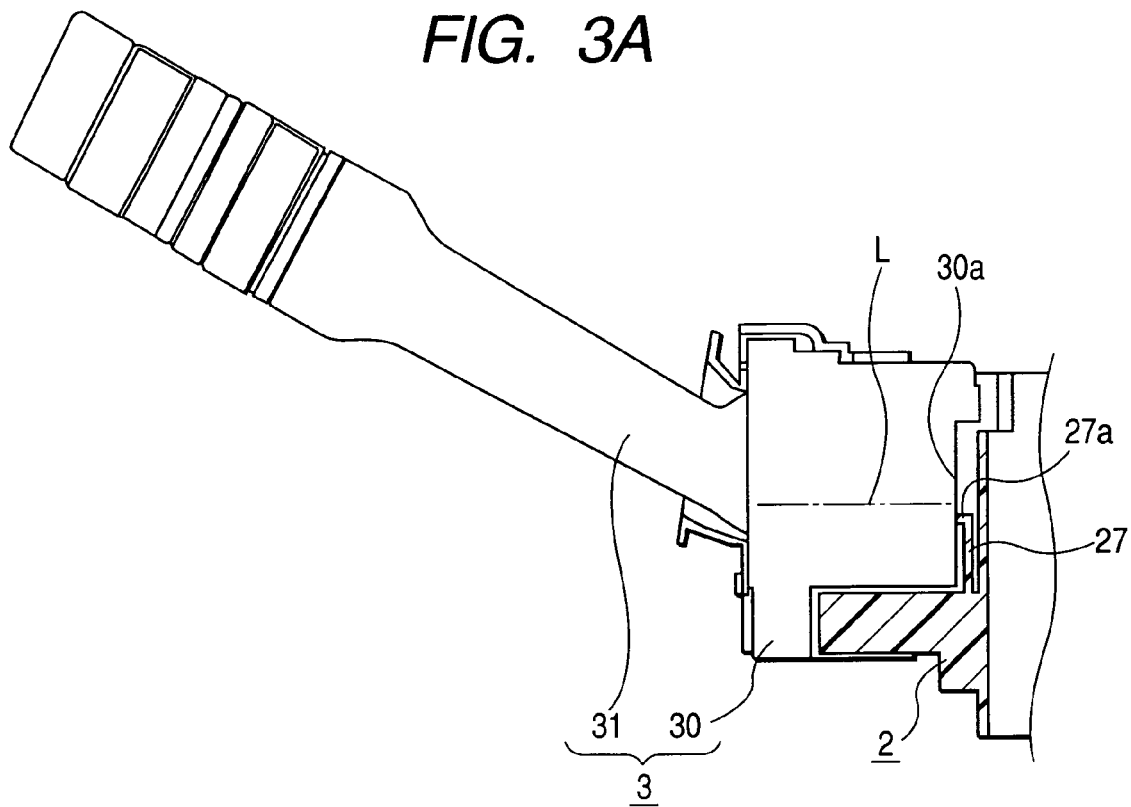
FIG. 3 is an assembly process chart of the stork switch being in elastically contact with an elastic plate in a housing.
Figure 3B:
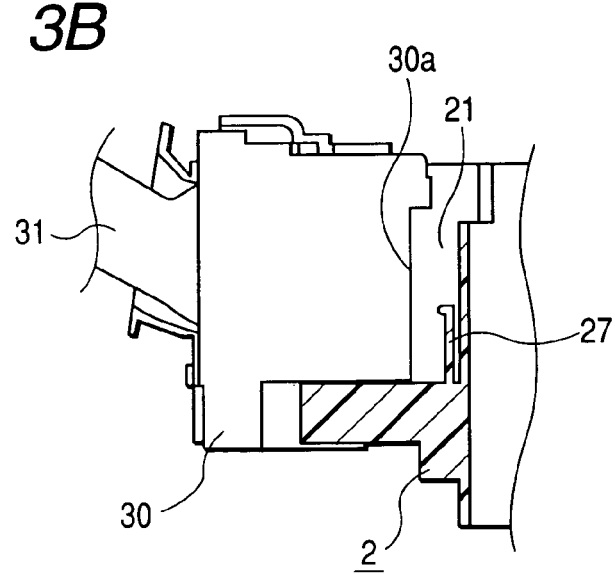

Next, the assembling work for assembling the switch box 30 of the stork switch 3 with the housing 2 by snap-fitting will be described. First, while the front 30a of the switch box 30 faces the mouth 21a of the housing 2, the snap 33 and the guiding protrusion 34 are positioned into the wide and narrow guide grooves 24 and 25, respectively. Then, the switch box 30 is inserted into the receiving portion 21. The snap 33 is guided in the wide guide groove 24 and the guiding protrusion 34 is guided in the narrow groove 25, whereby the switch box can be smoothly inserted into the receiving portion 21 without deviating from the grooves and held in place. As shown in FIG. 3B, the front 30a of the switch box 30 is close to the elastic plate 27. As a result, when the switch box 30 is inserted into the receiving portion 21 at a predetermined distance, the front 30a comes in contact with the pushing-end 27a of the elastic plate 27, but the claw 33a of the snap 33 is not yet snap-fitted to the locking hole 26. However, as the switch box 30 is inserted slightly more into the receiving portion 21, the elastic plate 27 is bent and the claw 33a is snap-fitted into the locking hole 26. Accordingly, the switch box 30 is positioned and fixed in the housing 2 as shown in FIG. 3A. When the switch box 30 has been snap-fitted and completely mounted at a predetermined position in the housing 2, the front 30a is in elastical contact with the bent pushing-end 27a of the elastic plate 27. Therefore, reaction force of the elastic plate 27 acts on the switch box 30 in an opposite direction to the insertion, and the claw 33a of the snap 33 is pushed against a periphery (a part of the wall 23) of the locking hole 26 toward the mouth 21a and remains in this condition.

In the automotive combination switch 1 of the above embodiment, the snap 33 of the switch box 30 is fitted into the locking hole 26 of the wall 23 with the elastic plate 27 pushed to be bent. For this reason, when the switch box 30 has been completely snap-fitted, the claw 33a of the snap 33 is pushed against the periphery of the locking hole 26. Accordingly, although the combination switch is designed to have a required clearance between the claw 33a of the snap 33 and the locking hole 26 to smoothly snap-fit the stork switch 3 in the housing 2 at low cost, the stork switch 3 does not rattle after being mounted.

Further, in the automotive combination switch 1, the snaps 33 are formed on the outside of the pair of substantially parallel walls 32 of the switch box 30, respectively, and the locking holes 26 are formed on the pair of substantially parallel walls 23 of the housing 2 for snap-fitting of the snaps 33. Therefore, the switch box 30 is smoothly inserted into the housing 2 without interference of the inner wall of the housing 2 and held in place.

Furthermore, in the automotive combination switch 1, even though the elastic plate 27 is formed in the housing 2, space factors are not affected, because a recess 30b is formed at the front 30a of the switch box 30 and the elastic plate 27 of the housing is stuck into the recess 30b. Also, because the position and height of the elastic plate 27 are determined such that the center line L of the stork switch 30 extends close to the pushing-end 27a of the elastic plate 27 in the inserting direction, the switch box 30 is not inclined in the housing 2.

In the automotive combination switch, the stork box of the stork switch is inserted into the housing and snap-fitted therein, the stork box is pushed in the opposite direction to the inserting direction by the reacting force of the elastic plate in the housing, as a result, the claw of the snap formed on the switch box is pushed against the periphery of the locking hole. Accordingly, although the combination switch is designed to have a required clearance between the claw of the snap and the locking hole in order to smoothly snap-fit the stork switch in the housing at a low cost, the stork switch does not rattle after combination is completed. Therefore, an automotive combination switch can be provided, in which a stork switch can be smoothly snap-fitted in a housing at a low cost and may not rattle after mounted.

The invention claimed is:

1. An automotive combination switch comprising:
   a housing having an opening through which a steering shaft passes, the housing being fixed to a stator of a car body;
   a switch box configured to be received within the housing;
   a stork switch having a manipulating rod extending from the switch box;
   a plurality of snaps protruding from an exterior portion of the switch box, each snap having a claw portion-configured to snap-fit into locking holes formed in walls of the housing;
   an elastic plate disposed in the housing; and
   wherein when the switch box is snap-fitted into the housing, a front portion of the switch box contacts the elastic plate and is urged against the elastic plate to provide a biasing force against the switch box in a direction opposite to a direction of insertion so that each claw portion is urged against a periphery of each locking hole to releasably retain the switch box in the housing.

2. The automotive combination switch according to claim 1, wherein the snaps are formed on the outsides of a pair of substantially parallel walls of the switch box.

3. The automotive combination switch according to claim 2, wherein a recess is formed at the front portion of the switch box and is configured to receive the elastic plate.

4. The automotive combination switch according to claim 1, wherein a recess is formed at the front portion of the switch box and is configured to receive the elastic plate.

5. An automotive combination switch according to claim 1, wherein the snaps are snap-fitted into locking holes by laterally inserting the switch box into the housing.

6. The automotive combination according to claim 1, wherein the locking holes are formed on a pair of substantially parallel walls of the housing.

7. The automotive combination switch according to claim 1, wherein the elastic plate includes an urging member configured to contact the front portion of the switch box.

8. The automotive combination switch according to claim 7, wherein when the switch box is inserted into a receiving portion of the housing by a predetermined distance, the urging member of the elastic plate contacts the front portion of the switch box and elastically deforms creating a biasing force against the switch box in a direction opposite the insertion direction.

9. The automotive combination switch according to claim 8, wherein the urging member of the elastic plate contacts the switch box at height near a centerline of the switch box.

10. The automotive combination switch according to claim 8, wherein the front portion of the switch box has a curved face which follows a contour of the urging member.

11. The automotive combination switch according to claim 7, wherein the urging member of the elastic plate contacts the switch box at height near a centerline of the switch box.

12. The automotive combination switch according to claim 7, wherein the urging member is curved.

* * * * *